(12) United States Patent
Albasheir et al.

(10) Patent No.: US 10,694,445 B2
(45) Date of Patent: Jun. 23, 2020

(54) METHODS FOR SERVING GATEWAY SELECTION BASED ON TYPE-OF-SERVICE IN A WIRELESS COMMUNICATION NETWORK

(71) Applicant: T-Mobile USA, Inc., Bellevue, WA (US)

(72) Inventors: Suliman Albasheir, Issaquah, WA (US); Aziz Motiwala, Bellevue, WA (US); Karunakalage Viraj Rakitha Silva, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 45 days.

(21) Appl. No.: 16/052,477

(22) Filed: Aug. 1, 2018

(65) Prior Publication Data

US 2019/0223076 A1 Jul. 18, 2019

Related U.S. Application Data

(60) Provisional application No. 62/618,526, filed on Jan. 17, 2018.

(51) Int. Cl.
| | |
|---|---|
| *H04W 4/00* | (2018.01) |
| *H04W 40/02* | (2009.01) |
| *H04L 29/12* | (2006.01) |
| *H04W 8/08* | (2009.01) |
| *H04W 8/26* | (2009.01) |
| *H04W 88/16* | (2009.01) |
| *H04W 48/18* | (2009.01) |
| *H04W 88/18* | (2009.01) |

(52) U.S. Cl.
CPC ......... *H04W 40/02* (2013.01); *H04L 61/1511* (2013.01); *H04W 8/08* (2013.01); *H04W 8/26* (2013.01); *H04W 48/18* (2013.01); *H04W 88/16* (2013.01); *H04W 88/18* (2013.01)

(58) Field of Classification Search
None
See application file for complete search history.

(56) References Cited

U.S. PATENT DOCUMENTS

2019/0191471 A1* 6/2019 Yoshikawa ........... H04W 76/12

* cited by examiner

*Primary Examiner* — Zewdu A Beyen
(74) *Attorney, Agent, or Firm* — Lee & Hayes, P.C.

(57) ABSTRACT

A technique of associating each Serving Gateway (SGW) with a corresponding Packet Data Network (PDN) gateway (PGW) to provide a particular type of wireless service to mobile devices in the wireless communication network is discussed herein. In configurations, the technique includes co-locating a SGW with a corresponding PGW in the same, physical node of the wireless communication network to provide a first S/PGW pair. In configurations, the first co-located S/PGW pair may be dedicated to provide data services to mobile devices in the wireless communication network. The technique also includes co-locating another SGW with a corresponding PGW in the same, physical node of the wireless communication network that is different from the physical node that includes the first S/PGW pair to provide a second S/PGW pair. In configurations, the second co-located S/PGW pair may be dedicated to provide voice services to mobile devices in the wireless communication network.

17 Claims, 5 Drawing Sheets

METHODS FOR SERVING GATEWAY SELECTION BASED ON TYPE-OF-SERVICE IN A WIRELESS COMMUNICATION NETWORK

PRIORITY CLAIM AND CROSS-REFERENCE TO RELATED APPLICATIONS

This Application is a non-provisional of, and claims priority under 35 USC § 119(e), to U.S. Provisional Patent Application No. 62/618,526, filed Jan. 17, 2018, which is fully incorporated by reference herein as if fully set forth below.

BACKGROUND

In recent years, mobile telecommunication devices have advanced from offering simple voice calling services within wireless communication networks to providing users with many new features. Mobile telecommunication devices now provide messaging services such as email, text messaging, and instant messaging; data services such as internet browsing; media services such as storing and playing a library of favorite songs; location services; and many others. In addition to the new features provided by the mobile telecommunication devices, users of such mobile telecommunication devices have greatly increased. Such an increase in users is only expected to continue and, in fact, it is expected that there could be a growth rate of twenty times more users in the next few years alone.

In general, mobile devices communicate with base stations (or access points that communicate with the base stations) within a wireless communication network. Typically, data services, such as internet-related services, are directed from a base station to an anchor Serving Gateway (SGW). From the anchor SGW, the data is routed to a Packet Data Network (PDN) gateway (PGW) for routing of the data services to a data services provider network, e.g., the Internet. If the data routed to the anchor SGW is for voice services, then the SGW routes the data to a second PGW to route to voice services provider network, e.g., an Internet Protocol Multimedia Core Network Subsystem (IMS). Thus, the anchor SGW essentially serves as a router. Such an arrangement can lead to delays in routing data packets, inefficient routing of data packets and increased costs for data services and voice services to and from UEs due to the use of multiple nodes for the routing of data packets.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein is a wireless communication network that includes techniques and architecture of associating each Serving Gateway (SGW) with a corresponding Packet Data Network (PDN) gateway (PGW) and selecting a SGW/PGW pair based on a particular type of service for mobile devices in the wireless communication network. In configurations, the association of a particular SGW is by virtue of the particular SGW being co-located with its corresponding PGW into a S/PGW in the same physical node of a wireless communication network. Certain S/PGWs can be used to provide voice services to mobile devices, while other S/PGWs can be used to provide data services, e.g., internet services, to mobile devices. By co-locating a particular SGW with a corresponding PGW into the same physical node for a particular type of service, wireless traffic from base stations only needs to be routed once, e.g., to the appropriate S/PGW physical node. This can reduce the costs of multiple nodes, improve efficiencies in routing of wireless traffic and reduce delays in the routing of wireless traffic.

In a configuration, a first S/PGW pair is co-located within a single physical first node of the wireless communication network. The first S/PGW may be configured to handle data services, e.g., services provided by the Internet. Thus, for a mobile device, a communication conduit is established between the base station and the first S/PGW for services directed to the Internet for the mobile device within the wireless communication network. A second S/PGW pair is co-located within a single physical second node of the wireless communication network and is configured to handle voice services, e.g., telephone calls, SMS messaging, MMS messaging, etc., on behalf of the mobile device.

Accordingly, when the mobile device wishes to receive data services, e.g., internet services, using the wireless communication network, a request for such services from the mobile device is received by the base station and routed over a first communication conduit to the first S/PGW pair at the first node. Based at least in part on the type of services requested, e.g., data services, and/or an Access Point Name (APN) provided by the mobile device, the first S/PGW pair at the first node is selected and can then forward and receive data to and from the Internet via the base station on behalf of the mobile device, thereby providing the mobile device with data services. For voice services, the mobile device forwards a request for voice services to the base station, which then forwards the request to the second S/PGW pair at the second node. Based at least in part on the type of services requested, e.g., voice services, and/or an APN provided by the mobile device, the second S/PGW pair is selected and can then provide voice services to and from a voice service network such as, for example, an Internet Protocol Multimedia Core Network Subsystem (IMS). Accordingly, the mobile device is now able to receive data services directly through the first S/PGW pair at the first node without the services passing through multiple physical nodes for a SGW and a PGW. Also, the mobile device is now able to receive voice services directly through the second S/PGW pair at the second node without the services passing through multiple physical nodes for a SGW and a PGW.

Other types of services may be provided by other co-located S/PGW pairs and may be selected based at least in part on a mobile device requesting other types of services. Also, if an appropriate SGW, based at least in part on a mobile device's request for a particular service, is not co-located with a PGW, an appropriate SGW may still be selected to provide the mobile device with the requested service and a PGW will be utilized that is not co-located in the same physical node as the selected SGW.

Figure 1A:
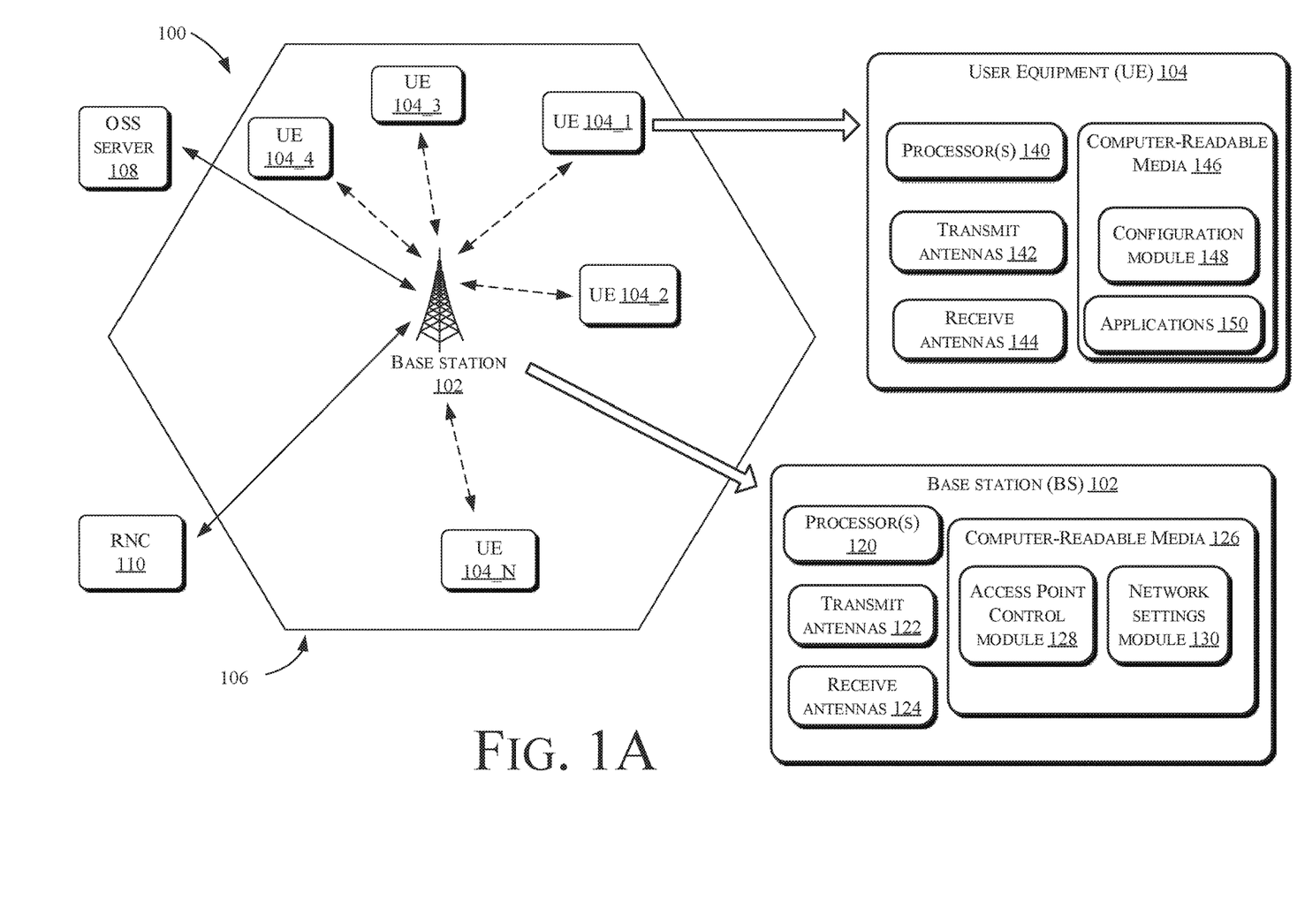
FIGS. 1A and 1B schematically illustrate an example of a wireless communication network, in accordance with various configurations.

FIG. 1A schematically illustrates an example wireless communication network 100 (also referred to herein as network 100). The network 100 comprises a Base Station (BS) 102 communicatively coupled to a plurality of user devices or user equipment, referred to as User Equipment (UE) 104_1, 104_2, . . . , 104_N, where N is an appropriate integer. The BS 102 serves UEs 104 located within a geographical area, e.g., within a macro cell 106. FIG. 1A illustrates the macro cell 106 to be hexagonal in shape, although other shapes of the macro cell 106 may also be possible. In general, the network 100 comprises a plurality of macro cells 106, with each macro cell 106 including one or more BSs 102. In configurations, the macro cells 106 may be divided into small cells (not illustrated), e.g., femto cells, pico cells, micro cells, or the like. The multiple macro cells 106 and small cells may be organized into multiple subnetworks that make up the wireless communication network 100. For example, the wireless communication network 100 may be a national network and, thus, the wireless communication network 100 may be divided into four regional subnetworks, where each regional subnetwork includes multiple macro cells 106 that may be divided into small cells.

In a configuration, the UEs 104_1, . . . , 104_N may comprise any appropriate devices, e.g., stationary devices, portable electronic devices or mobile devices, for communicating over a wireless communication network. Such devices include mobile telephones, cellular telephones, internet protocol (IP) telephones, mobile computers, Personal Digital Assistants (PDAs), radio frequency devices, handheld computers, laptop computers, tablet computers, palmtops, pagers, devices configured as IoT devices, IoT sensors that include cameras, integrated devices combining one or more of the preceding devices, and/or the like. As such, UEs 104_1, . . . , 104_N may range widely in terms of capabilities and features. For example, one of the UEs 104_1, . . . , 104_N may have a numeric keypad, a capability to display only a few lines of text and be configured to interoperate with only Global System for Mobile Communications (GSM) networks. However, another of the UEs 104_1, . . . , 104_N (e.g., a smart phone) may have a touch-sensitive screen, a stylus, an embedded GPS receiver, and a relatively high-resolution display, and be configured to interoperate with multiple types of networks. UEs 104_1, . . . , 104_N may also include SIM-less devices (i.e., mobile devices that do not contain a functional subscriber identity module ("SIM")), roaming mobile devices (i.e., mobile devices operating outside of their home access networks), and/or mobile software applications.

In a configuration, the BS 102 may communicate voice traffic and/or data traffic with one or more of the UEs 104_1, . . . , 104_N using RF signals. The BS 102 may communicate with the UEs 104_1, . . . , 104_N using one or more appropriate wireless communication protocols or standards. For example, the BS 102 may communicate with the UEs 104_1, . . . , 104_N using one or more standards, including but not limited to GSM, Internet Protocol (IP) Multimedia Subsystem (IMS), Time Division Multiple Access (TDMA), Universal Mobile Telecommunications System (UMTS), Evolution-Data Optimized (EVDO), Long Term Evolution (LTE), Fifth Generation (5G), Generic Access Network (GAN), Unlicensed Mobile Access (UMA), Code Division Multiple Access (CDMA) protocols (including IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), Wi-Fi protocols (including IEEE 802.11 protocols), WiMAX protocols (including IEEE 802.16e-2005 and IEEE 802.16m protocols), High Speed Packet Access (HSPA), (including High Speed Downlink Packet Access (HSDPA) and High Speed Uplink Packet Access (HSUPA)), Ultra Mobile Broadband (UMB), and/or the like.

The BS 102 may be communicatively coupled (e.g., using a backhaul connection, illustrated using solid lines in FIG. 1) to a number of backhaul equipments, e.g., an Operation Support Subsystem (OSS) server 108, a Radio Network Controller (RNC) 110, and/or the like. In configurations, the RNC 110 can also be in the form of a Mobility Management Entity (MME) that serves as a gateway when the wireless communication network 100 operates according to the LTE standard or LTE Advanced standard, as will be discussed further herein.

In a configuration, the base station 102 may comprise processor(s) 120, one or more transmit antennas (transmitters) 122, one or more receive antennas (receivers) 124, and computer-readable media 126. The processor(s) 120 may be configured to execute instructions, which may be stored in the computer-readable media 126 or in other computer-readable media accessible to the processor(s) 120. In some configurations, the processor(s) 120 are a Central Processing Unit (CPU), a Graphics Processing Unit (GPU), or both CPU and GPU, or any other sort of processing unit. The base station 102 can also be in the form of, for example, a Node B (where the wireless communication network 100 is 3G UMTS network), in the form of an eNodeB (where the wireless communication network 100 operates according to the LTE standard or LTE Advanced standard), in the form of a gNodeB (where the wireless communication network 100 operates according to the 5G standard), etc.

The one or more transmit antennas 122 may transmit signals to the UEs 104_1, . . . , 104_N, and the one or more receive antennas 124 may receive signals from the UEs 104_1, . . . , 104_N. The antennas 122 and 124 include any appropriate antennas known in the art. For example, antennas 122 and 124 may include radio transmitters and radio receivers that perform the function of transmitting and receiving radio frequency communications. In a configuration, the antennas 122 and 124 may be included in a transceiver component of the BS 102.

The computer-readable media 126 may include Computer-Readable Storage Media ("CRSM"). The CRSM may be any available physical media accessible by a computing device to implement the instructions stored thereon. CRSM may include, but is not limited to, Random Access Memory ("RAM"), Read-Only Memory ("ROM"), Electrically Erasable Programmable Read-Only Memory ("EEPROM"), flash memory or other memory technology, Compact Disc Read-Only Memory ("CD-ROM"), Digital Versatile Discs ("DVD") or other optical disk storage, magnetic cassettes, magnetic tape, magnetic disk storage or other magnetic storage devices, or any other medium which can be used to store the desired information and which can be accessed by the base station 102. The computer-readable media 126 may reside within the base station 102, on one or more storage devices accessible on a local network to the base station 102, on cloud storage accessible via a wide area network to the base station 102, or in any other accessible location.

The computer-readable media 126 may store modules, such as instructions, data stores, and so forth that are configured to execute on the processor(s) 120. For instance, the computer-readable media 126 may store an access point control module 128 and a network settings module 130, as will be discussed in more detail herein later.

Although FIG. 1A illustrates the computer-readable media 126 in the BS 102 storing the access point control module 128 and the network settings module 130, in various other configurations, the access point control module 128, the network settings module 130, and one or more other modules (not illustrated, may be stored in another component of the network 100 (e.g., other than the BS 102). For example, one or more of these modules may be stored in a computer-readable media included in the OSS server 108, the RNC 110, another appropriate server associated with the network 100, and/or the like.

Although not illustrated in FIG. 1A, various other modules (e.g., an operating system module, Basic Input/Output Systems (BIOS), etc.) may also be stored in the computer-readable media 126. Furthermore, although not illustrated in FIG. 1, the base station 102 may comprise several other components, e.g., a power bus configured to supply power to various components of the base station 102, one or more interfaces to communicate with various backhaul equipment, and/or the like.

In a configuration, the UEs 104 may comprise processor(s) 140, one or more transmit antennas (transmitters) 142, one or more receive antennas (receivers) 144, and computer-readable media 146 in the form of memory and/or cache. The processor(s) 140 may be configured to execute instructions, which may be stored in the computer-readable media 146 or in other computer-readable media accessible to the processor(s) 140. In some configurations, the processor(s) 140 is a Central Processing Unit (CPU), a Graphics Processing Unit (GPU), or both CPU and GPU, or any other sort of processing unit. The one or more transmit antennas 142 may transmit signals to the base station 102, and the one or more receive antennas 144 may receive signals from the base station 102. In a configuration, the antennas 142 and 144 may be included in a transceiver component of the UE 104.

The computer-readable media 146 may also include CRSM. The CRSM may be any available physical media accessible by a computing device to implement the instructions stored thereon. CRSM may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which can be used to store the desired information and which can be accessed by the UE 104.

The computer-readable media 146 may store several modules, such as instructions, data stores, and so forth that are configured to execute on the processor(s) 140. For instance, the computer-readable media 146 may store a configuration module 148. In configurations, the computer-readable media 146 may also store one or more applications 150 configured to receive and/or provide voice, data and messages (e.g., Short Message Service (SMS) messages, Multi-Media Message Service (MMS) messages, Instant Messaging (IM) messages, Enhanced Message Service (EMS) messages, etc.) to and/or from another device or component (e.g., the base station 102, other UEs, etc.). The applications 150 may also include third-party applications that provide additional functionality to the UE 104.

Although not illustrated in FIG. 1A, the UEs 104 may also comprise various other components, e.g., a battery, a charging unit, one or more network interfaces, an audio interface, a display, a keypad or keyboard, and other input and/or output interfaces.

Although FIG. 1A illustrates only one UE (UE 104_1) in detail, each of the UEs 104_2, . . . , 104_N may have a structure that is at least in part similar to that of the UE 104_1. For example, similar to the UE 104_1, each of the UEs 104_2, . . . , 104_N may comprise processor(s), one or more transmit antennas, one or more receive antennas, and computer-readable media including a configuration module.

In a configuration, the network settings module 130 stored in the computer-readable media 126 maintains a plurality of network settings associated with the network 100. Individual network settings maintained by the network settings module 130 may be pertinent to a single UE of the UEs 104_1, . . . , 104_N, a subset of the UEs 104_1, . . . , 104_N, or each of the UEs 104_1, . . . , 104_N. For example, a network setting of the plurality of network settings may specify a maximum bit rate at which a UE (or each of the UEs 104_1, . . . , 104_N) may transmit data to the BS 102. Another network setting of the plurality of network settings may specify a Transmit Time Interval (TTI) used by each of the UEs 104_1, . . . , 104_N to transmit data to the BS 102. Yet another network setting of the plurality of network settings may specify a maximum power that each of the UEs 104_1, . . . , 104_N may use to transmit data to the BS 102. The plurality of network settings maintained by the network settings module 130 may also include any other appropriate type of network settings.

In a configuration, one or more of the plurality of network settings maintained by the network settings module 130 may be communicated to the UEs 104_1, . . . , 104_N (e.g., by the transmit antennas 122 to the receive antennas 144 of the UEs 104_1, . . . , 104_N). Based on receiving the network settings, the UEs 104_1, . . . , 104_N (e.g., the corresponding configuration modules 148) may configure themselves and communicate with the BS 102 accordingly.

Figure 1B:
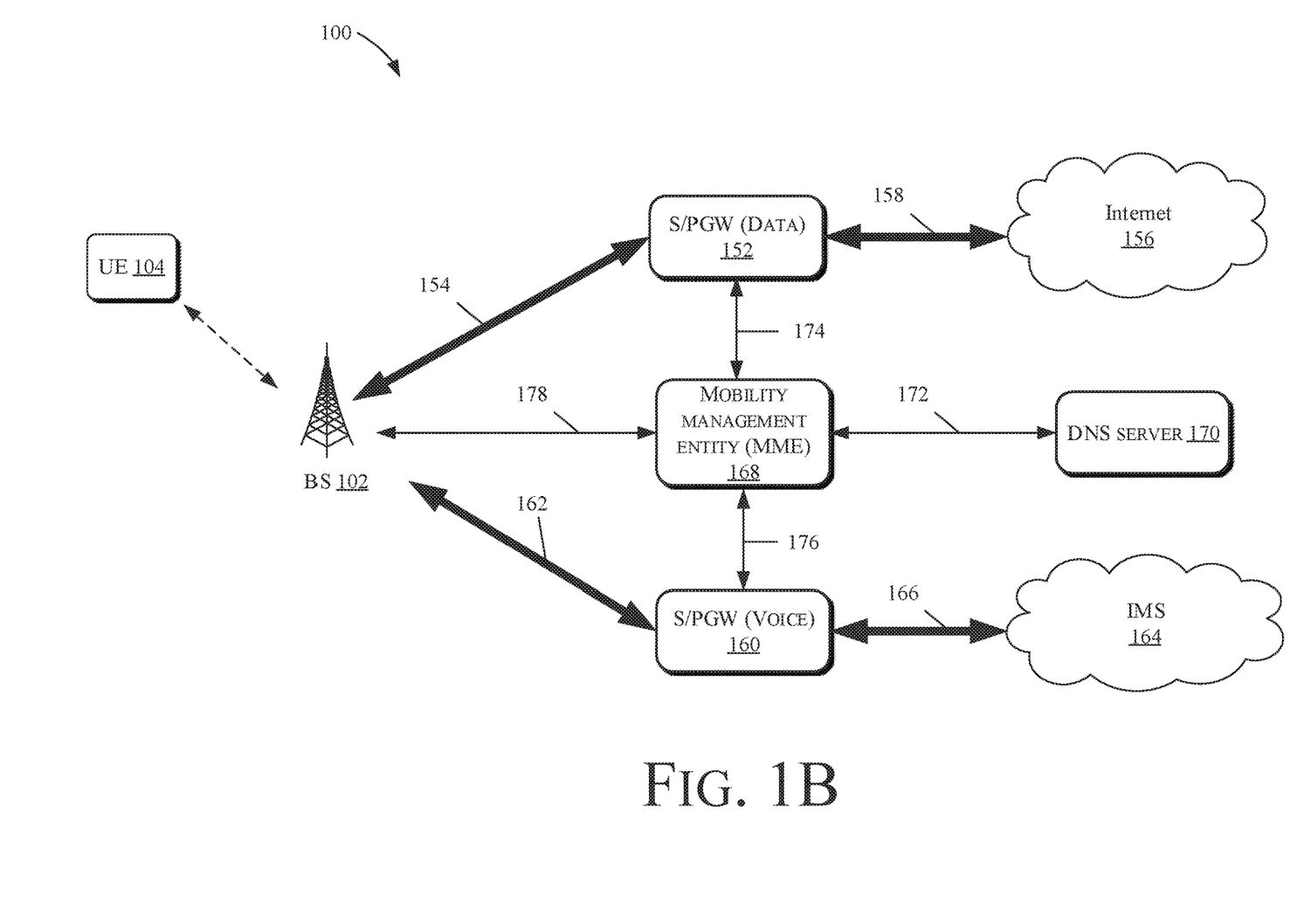

FIG. 1B schematically illustrates an arrangement where the wireless communication network 100 is configured as an Evolved Universal Mobile Telecommunications System (UMTS) Terrestrial Radio Access Network (E-UTRAN) and the base station 102 is configured as an E-UTRAN node B, also known as an Evolved Node B, (eNodeB). The network 100 includes a first Serving Gateway (SGW) and a first Packet Data Network gateway (PGW) pair (S/PGW) 152, co-located within a single physical node, although the first SGW and the first PGW are separate entities within the node. The first S/PGW pair 152 may be configured/designated to provide a particular type of service to UEs 104, e.g., data services. Thus, the first S/PGW pair 152 may have a particular Access Point Name (APN) reflective of the type of service provided.

The first S/PGW pair 152 is communicatively coupled to the base station 102 via a S1-U communication conduit 154 for the UE 104. The first S/PGW pair 152 is communicatively coupled to a network (e.g., the Internet) 156 via a Gi communication conduit 158 to provide data services to the UE 104 via the S1-U communication conduit 154 and the base station 102. In configurations, the first S/PGW pair 152 may be associated with each other in other ways. For example, the SGW and the PGW of the first S/PGW 152 may not be co-located in the same node, but may still be designated and configured to only work with each other to provide data services.

The wireless communication network 100 further includes a second SGW and a second PGW pair (S/PGW) 160, co-located within a single physical node, although the second SGW and the second PGW are separate entities within the node. The second S/PGW pair 160 is communicatively coupled to the base station 102 via a S1-U communication conduit 162 for the UE 104. The second S/PGW pair 160 may be configured/designated to provide a particular type of service to UEs 104, e.g., voice services. Thus, the second S/PGW pair 160 may have a particular APN reflective of the type of service provided.

The second S/PGW 160 is communicatively coupled to a voice network (e.g., an IMS) 164 via a Gi communication conduit 166 to provide voice services (e.g., telephone calls, SMS messages, MMS messages, etc.) to the UE 104 via the S1-U communication conduit 166 and the base station 102. In configurations, the second S/PGW pair 160 may be associated with each other in other ways. For example, the SGW and the PGW of the second S/PGW 160 may not be co-located in the same node but may still be designated and configured to only work with each other to provide voice services.

The network 100 further includes a Mobility Management Entity (MME) 168 and a Domain Name System (DNS) server 170. The MME 168 is communicatively coupled to the DNS server 170 via a communication conduit 172. The MME 168 is communicatively coupled to the first S/PGW pair 152 via a S11 communication conduit 174 and is also communicatively coupled via the second S/PGW pair 160 by a S11 communication conduit 176. The MME 168 is communicatively coupled to the eNodeB base station 102 via a communication conduit 178.

Thus, as will be explained further herein, the UE 104 communicates with the eNodeB base station 102 in order to obtain various services within the wireless communication network 100. For data services for the UE 104, e.g., internet services, the eNodeB base station 102 communicates via the S1-U communication conduit 154 with the first S/PGW pair 152, which then communicates with the Internet via the Gi communication conduit 158, and vice versa. For voice services, the eNodeB base station 102 communicates via the S1-U communication conduit 162 with the second S/PGW pair 160, which then communicates with the IMS 164 via the Gi communication conduit 166, and vice versa.

While only one S/PGW pair 152 for data services is illustrated in FIG. 1B, the wireless communication network 100 includes multiple S/PGW pairs 152 for data services. Likewise, while only one S/PGW pair 160 for voice services is illustrated in FIG. 1B, the wireless communication network 100 includes multiple S/PGW pairs 152 for voice services. Also, as previously noted, the S/PGW pairs 152, 160 are comprised of separate SGWs and PGWs and each S/PWG pair 152, 160 is comprised of a SGW and a corresponding PGW in a one-to-one relationship that is co-located in a single physical node of the wireless communication network 100. Furthermore, each UE 104 is communicatively coupled to a first S/PGW pair 152 via a dedicated S1-U tunnel 154 and is communicatively coupled to a second S/PGW pair 160 via a dedicated S1-U tunnel 162.

Additionally, other types of services may be provided by other co-located S/PGW pairs (not illustrated) and may be selected based at least in part on a UE 104 requesting such other types of services and/or the appropriate APN. Also, if an appropriate SGW, based at least in part on a mobile device's request for a particular service, is not co-located with a PGW, an appropriate SGW may still be selected to provide the mobile device with the requested service and a PGW will be utilized that is not co-located in the same physical node as the selected SGW.

Figure 2:
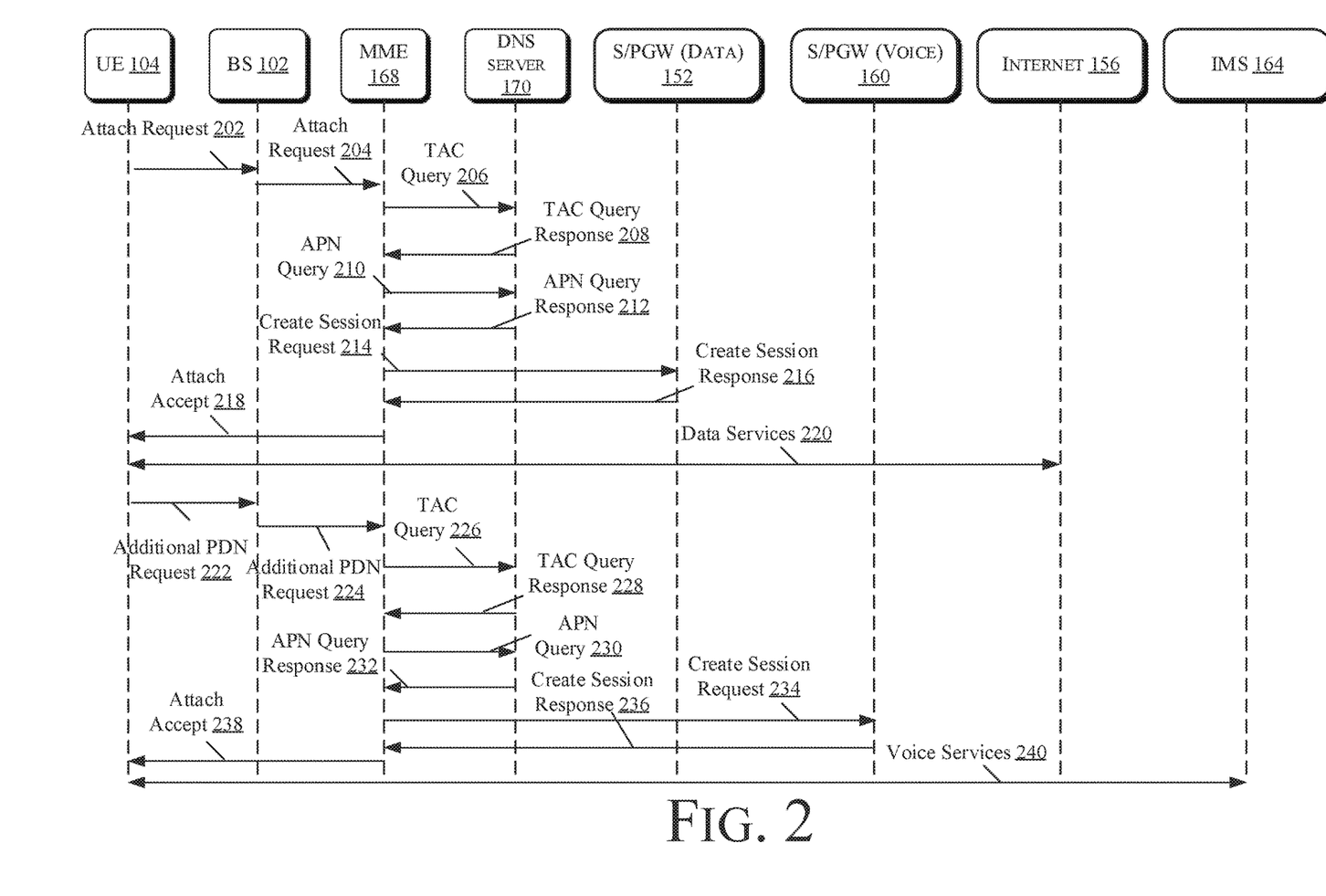
FIG. 2 is a flow diagram describing an example call flow sequence for registering a mobile device with a first S/PGW pair for data services within the wireless communication network of FIGS. 1A and 1B, and for registering the mobile device with a second S/PGW pair for voice services within the wireless communication network of FIGS. 1A and 1B, in accordance with various configurations.

FIG. 2 is a flow diagram illustrating an example call flow sequence for registering a UE 104 with a first S/PGW pair (e.g., S/PGW pair 152) for data services, e.g., internet services, within the wireless communication network 100, and for registering the UE 104 with a second S/PGW pair (e.g., the second S/PGW pair 160) for voice services within the wireless communication network 100. As a first step 202, the UE 104 sends an Attach Request message to the eNodeB 102 with an Evolved System Session Management (ESM) container containing the Access Point Name (APN) towards which the UE 104 wishes to create a PDN connection. For example, the UE 104 may wish to receive data services from the Internet 156. At a second step 204, the Attach Request message is forwarded to the MME 168 by the eNodeB 102. The MME 168 then sends a DNS query, to the DNS server 170, consisting of the Tracking Area Code (TAC) where the UE 104 is located, at a third step 206.

At a fourth step 208, the DNS server 170 sends a list of SGW candidates based on the TAC. At a fifth step 210, the MME 168 sends a DNS query consisting of the APN it received in the Attach Request Message (or a default APN if an APN was not present). For example, if a UE 104 requests an incorrect APN, the MME 168 defaults the request to the Home Subscriber Server (HSS) of the wireless communication network 100. An example of this situation includes a 'Bring Your Own Device" (BYOD) scenario, where a user brings their own UE 104 to, for example, a workplace. At a sixth step 212, the DNS 170 responds with a list of PGW candidates supporting the requested APN. The MME 168 performs a selection of a co-located SGW and PGW pair based on the best match. The selection may be based on, for example, level of traffic at a node including the co-located SGW and PGW pair, Quality of Service (QoS) at a node including the co-located SGW and PGW pair, randomness, priorities, weights, etc. The MME 168 then sends a Create Session Request message to the selected S/PGW pair 152, at a seventh step 214.

At an eighth step 216, the S/PGW pair 152 then responds to the MME 168 with a Create Session Response message. At a ninth step 218, the attach request is now accepted. At a tenth step 220, the UE 104 can now receive data services through the selected and co-located S/PGW pair 152. The wireless traffic, e.g., data packets for data services, will flow from the UE 104 to the eNodeB 102 to the first S/PGW pair 152 and then to the Gi communication conduit 158 to the Internet 156, and vice versa.

At an eleventh step 222, the UE 104 requests an additional PDN for voice services to the eNodeB 102 with a new APN. The eNodeB 102 forwards the request for an additional PDN to the MME 168 at a twelfth step 224. Since the request is for a different PDN, the MME 168 will query the DNS 170 for a new list of SGW candidates based on the TAC at a thirteenth step 226. At a fourteenth step 228, the DNS 170 responds with a new list of SGW candidates based on the TAC. The new list might have overlaps with the list of SGW candidates previously received.

At a fifteenth step 230, the MME 168 sends another DNS query with the new APN for PGW selection. At a sixteenth step 232, the DNS server 170 responds with a candidate list containing PGW candidates supporting the new APN for voice services. The MME 168 selects the second S/PGW pair 160, with a co-located SGW and a co-located PGW. The second S/PGW pair 160 is different from the first S/PGW pair 152. The selection may be based on, for example, level of traffic at a node including the co-located SGW and PGW pair, Quality of Service (QoS) at a node including the co-located SGW and PGW pair, randomness, priorities, weights, etc. The MME 168 sends a Create Session Request message to the second S/PGW pair 160, at a seventeenth step 234. At an eighteenth step 236, the second S/PGW pair 160 then responds back with a Create Session Response message. At a nineteenth step 238, the additional PDN request is now accepted. At a twentieth step 240, the UE 104 is now able to use voice services through the second S/PGW pair. The wireless traffic, e.g., data packets, for voice services will flow from the UE 104 to the eNodeB 102 to the second S/PGW pair 160 and then to the IMS network 164 via the Gi communication conduit 166, and vice versa.

The example call flow sequence of FIG. 2 may be used and/or extended for other types of services that may be provided by other co-located S/PGW pairs (not illustrated) in order to select such other co-located S/PGW pairs based at least in part on a UE 104 requesting such other types of services and/or an APN provided by the UE 104.

Figure 3:
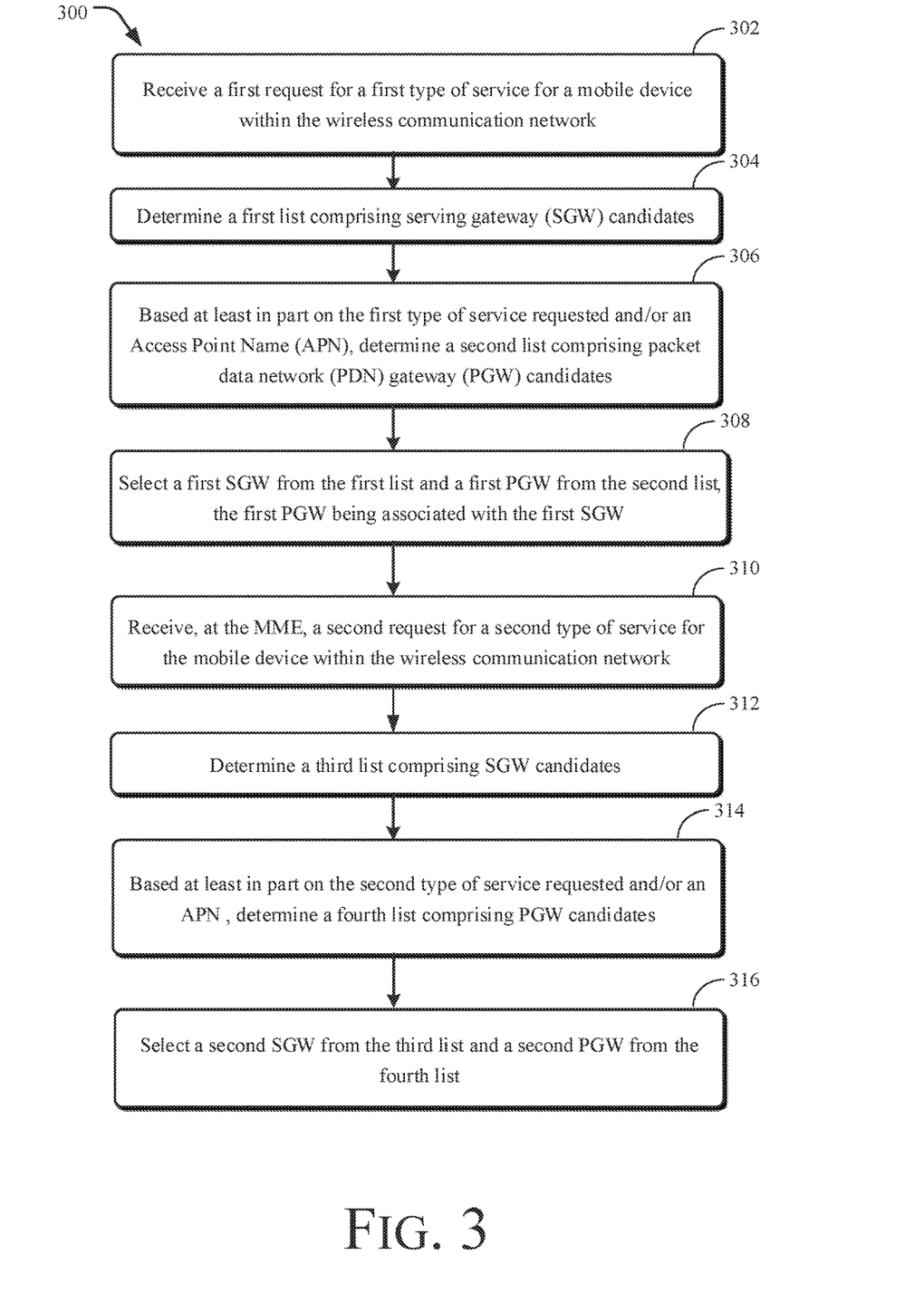
FIG. 3 is a flowchart illustrating a method of associating each Serving Gateway (SGW) with a corresponding Packet Data Network (PDN) gateway (PGW) to provide a particular type of wireless service to mobile devices in the wireless communication network of FIGS. 1A and 1B, in accordance with various configurations.

FIG. 3 is a flow diagram of an illustrative process that may be implemented within or in association with the wireless communication network 100. This process (as well as other processes described throughout) is illustrated as a logical flow graph, each operation of which represents a sequence of operations that can be implemented in hardware, software, or a combination thereof. In the context of software, the operations represent computer-executable instructions stored on one or more tangible computer-readable storage media that, when executed by one or more processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to wireless networks, the architectures and techniques are equally applicable to processor(s) and processing cores in other environments and computing devices.

FIG. 3 is a flow diagram illustrating an example method 300 of associating each Serving Gateway (SGW) with a corresponding Packet Data Network (PDN) gateway (PGW) to provide a particular type of wireless service to mobile devices, e.g., UEs 104, in a wireless communication network, e.g., wireless communication network 100. As illustrated, at block 302, a first request for a first type of service for a mobile device within the wireless communication network is received. For example, the first request may be received by a Mobility Management Entity (MME), e.g., MME 168. At block 304, a first list comprising Serving Gateway (SGW) candidates is determined. At block 306, based at least in part on the first type of service requested and/or an Access Point Name (APN) provided by the mobile device, a second list comprising Packet Data Network (PDN) gateway (PGW) candidates is determined. In configurations, each PGW candidate of the second list is associated with a corresponding SGW candidate of the first list. At block 308, a first SGW from the first list and a first PGW from the second list is selected. For example, the MME 168 may select the first SGW from the first list and a first PGW from the second list. In configurations, the first PGW is associated with the first SGW.

At block 310, a second request for a second type of service for the mobile device within the wireless communication network is received. For example, the second request may be received by the MME 168. At block 312, a third list comprising SGW candidates is determined. At block 314, based at least in part on the second type of service requested and/or an APN provided by the mobile device, a fourth list comprising PGW candidates is determined. In configurations, each PGW candidate of the fourth list is associated with a corresponding SGW candidate of the third list. At block 316, a second SGW from the third list and a second PGW from the fourth list is selected. For example, the second SGW from the third list and the second PGW from the fourth list may be selected by the MME 168. In configurations, the second PGW is associated with the second SGW. Also, the first SGW is different from the second SGW and the first PGW is different from the second PGW.

Thus, using the architecture and techniques described herein can improve efficiencies with routing of wireless traffic within a wireless communication network and save costs by reducing the number of physical nodes needed within the wireless communication network. Additionally, by separating the S/PGW pairs based upon data services and voice services, (as well as other services), updates to the S/PGW pairs based upon data services will not impact the S/PGW pairs that are directed to voice services, and vice versa. This can help reduce the potential for network problems and/or failures, where the source of the problem and/or failure is not related to the services provided by particular S/PGW pair.

Figure 4:
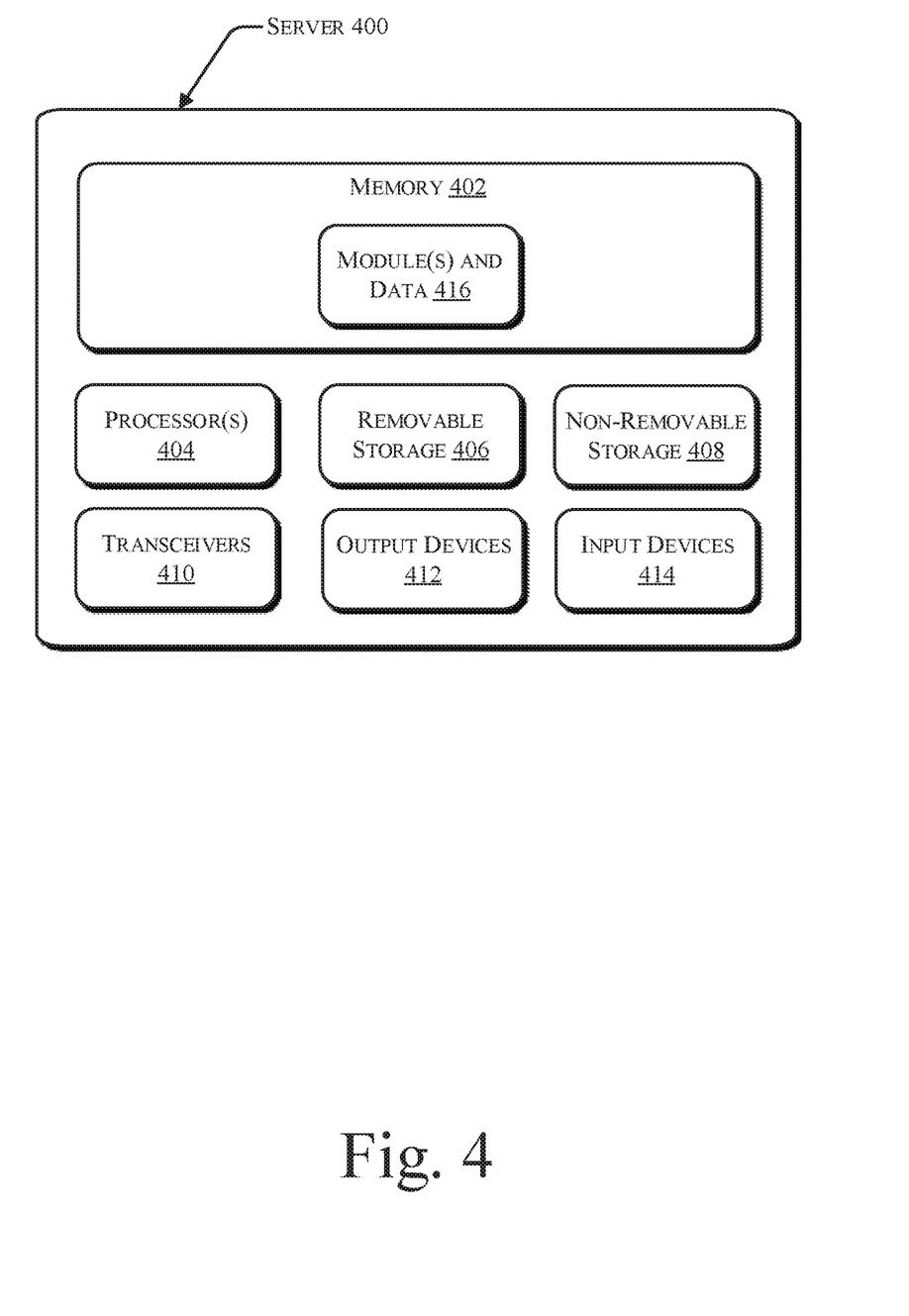
FIG. 4 schematically illustrates a component level view of a server configured for use in the wireless communication network of FIGS. 1A and 1B to provide various services of the wireless communication network of FIGS. 1A and 1B, in accordance with various configurations.

FIG. 4 illustrates a component level view of a server 400 configured for use within a wireless communication network, e.g., wireless communication network 100 in order to provide various services within the wireless communication network, according to the techniques described herein. The server 400 may serve as the OSS server 108 or may be located in the RNC or gateway 110, e.g., one or more servers 400 may be configured to serve as the MME 168. Additionally, the server 400 may serve as a SGW or a PGW. As illustrated, the server 400 comprises a system memory 402 that may store data and one or more modules and/or applications 416 for interacting with mobile devices 400, e.g., UEs 104, as described herein. Also, the server 400 includes processor(s) 404, a removable storage 406, a non-removable storage 408, transceivers 410, output device(s) 412, and input device(s) 414.

In various implementations, system memory 402 is volatile (such as RAM), non-volatile (such as ROM, flash memory, etc.) or some combination of the two. In some implementations, the processor(s) 404 is a Central Processing Unit (CPU), a Graphics Processing Unit (GPU), or both CPU and GPU, or any other sort of processing unit.

The server 400 may also include additional data storage devices (removable and/or non-removable) such as, for example, magnetic disks, optical disks, or tape. Such additional storage is illustrated in FIG. 4 by removable storage 406 and non-removable storage 408. The one or more of the memory 402, the removable storage 406 and/or the non-removable 408 may include module(s) and data 416 (illustrated in the memory 402). The module(s) and data 416 may include instructions executable by, for example, the processor(s) 404.

Non-transitory computer-readable media may include volatile and nonvolatile, removable and non-removable tangible, physical media implemented in technology for storage of information, such as computer readable instructions, data structures, program modules, or other data. System memory 402, removable storage 406 and non-removable storage 408 are all examples of non-transitory computer-readable media. Non-transitory computer-readable media include, but are not limited to, RAM, ROM, EEPROM, flash memory or other memory technology, CD-ROM, Digital Versatile Disks (DVD) or other optical storage, magnetic cassettes, magnetic tape, magnetic disk storage or other magnetic storage devices, or any other tangible, physical medium which can be used to store the desired information and which can be accessed by the server 400. Any such non-transitory computer-readable media may be part of the server 400.

In some implementations, the transceivers 410 include any sort of transceivers known in the art. For example, the transceivers 410 may include wired communication components, such as an Ethernet port, for communicating with other networked devices. Also, or instead, the transceivers 410 may include wireless modem(s) to may facilitate wireless connectivity with other computing devices. Further, the transceivers 410 may include a radio transceiver that performs the function of transmitting and receiving radio frequency communications via an antenna.

In some implementations, the output devices 412 include any sort of output devices known in the art, such as a display (e.g., a liquid crystal display), speakers, a vibrating mechanism, or a tactile feedback mechanism. Output devices 412 also include ports for one or more peripheral devices, such as headphones, peripheral speakers, or a peripheral display.

In various implementations, input devices 414 include any sort of input devices known in the art. For example, input devices 414 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method within a wireless communication network, the method comprising:
    receiving, by a Mobility Management Entity (MME), a first request for a first type of service for a mobile device within the wireless communication network;
    determining a first list comprising Serving Gateway (SGW) candidates;
    based at least in part on the first type of service requested, determining a second list comprising Packet Data Network (PDN) gateway (PGW) candidates, wherein each PGW candidate of the second list is associated with a corresponding SGW candidate of the first list;
    selecting, by the MME, a first SGW from the first list and a first PGW from the second list, the first PGW being associated with the first SGW;
    receiving, by the MME, a second request for a second type of service for the mobile device within the wireless communication network;
    determining a third list comprising SGW candidates;
    based at least in part on the second type of service requested, determining a fourth list comprising PGW candidates, wherein each PGW candidate of the fourth list is associated with a corresponding SGW candidate of the third list; and
    selecting, by the MME, a second SGW from the third list and a second PGW from the fourth list, the second PGW being associated with the second SGW,
    wherein the first SGW is different from the second SGW and the first PGW is different from the second PGW.

2. The method of claim 1, wherein each of the PGW candidates is associated with the corresponding SGW at least by virtue of each PGW candidate being co-located with its corresponding SGW within a same node of the wireless communication network.

3. The method of claim 1, wherein each of the PGW candidates of the fourth list is associated with the corresponding SGW of the second list at least by virtue of each PGW candidate of the fourth list being co-located with its corresponding SGW of the third list within a same node of the wireless communication network.

4. The method of claim 3, wherein each of the PGW candidates of the second list is associated with the corresponding SGW of the first list at least by virtue of each PGW candidate of the second list being co-located with its corresponding SGW of the first list within a same node of the wireless communication network.

5. The method of claim 1, wherein selecting a SGW is based at least in part on the first type of service requested.

6. The method of claim 1, wherein determining the first list comprising SGW candidates comprises:
    based at least in part on a Tracking Area Code (TAC) where the mobile device is located, sending, by the MME to a Domain Name System (DNS) server, a first DNS query requesting SGW candidates; and
    receiving, by the MIME from the DNS server, the first list comprising SGW candidates.

7. The method of claim 6, wherein determining the second list comprising PGW candidates comprises:
    sending, by the MME to the DNS server, a DNS query comprising a first Access Point Name (APN) towards which the mobile device wants to create a first PDN for the first type of service; and
    receiving, by the MME from the DNS server, the second list comprising PGW candidates supporting the first PDN.

8. The method of claim 7, wherein:
    the second request comprises a second APN towards which the mobile device wants to create a second PDN for the second type of service for the mobile device;
    determining the third list comprising SGW candidates comprises:
        based at least in part on the TAC where the mobile device is located, sending, by the MME to the DNS server, a second DNS query requesting SGW candidates; and
        receiving, by the MME from the DNS server, the third list comprising SGW candidates; and
    determining the fourth list comprising PGW candidates comprises:
        sending, by the MME to the DNS server, a DNS query including the second APN; and receiving, by the MME from the DNS server, the fourth list comprising PGW candidates supporting the second PDN.

9. The method of claim 8, wherein:
each of the PGW candidates of the second list is associated with the corresponding SGW of the first list at least by virtue of each PGW candidate of the second list being co-located with its corresponding SGW of the first list within a same node of the wireless communication network; and
each of the PGW candidates of the fourth list is associated with the corresponding SGW of the third list at least by virtue of each PGW candidate of the fourth list being co-located with its corresponding SGW of the third list within a same node of the wireless communication network.

10. A Mobility Management Entity (MME) within a wireless communication network, the MME comprising:
one or more processors;
a non-transitory storage medium; and
instructions stored in the non-transitory storage medium, the instructions being executable by the one or more processors to:
receive a first request for a first type of service for a mobile device within the wireless communication network;
determine a first list comprising Serving Gateway (SGW) candidates;
based at least in part on the first type of service requested, determine a second list comprising Packet Data Network (PDN) gateway (PGW) candidates, wherein each PGW candidate of the second list is co-located with a corresponding SGW candidate of the first list at a same node of the wireless communication network;
select a first SGW from the first list and a first PGW from the second list, the first SGW and the first PGW being co-located within a first node of the wireless communication network;
receive a second request for a second type of service for the mobile device within the wireless communication network;
determine a third list comprising SGW candidates;
based at least in part on the second type of service requested, determine a fourth list comprising PGW candidates, wherein each PGW candidate of the fourth list is co-located with a corresponding SGW candidate of the third list at a same node of the wireless communication network; and
select a second SGW from the third list and a second PGW from the fourth list co-located within a first node of the wireless communication network,
wherein the first SGW is different from the second SGW and the first PGW is different from the second PGW.

11. The MME of claim 10, wherein the first type of service relates to data service and the second type of service relates to voice service.

12. The MME of claim 11, wherein:
determine the first list comprising SGW candidates is performed by:
based at least in part on a Tracking Area Code (TAC) where the mobile device is located, sending, to a Domain Name System (DNS) server, a first DNS query requesting SGW candidates; and
receiving, from the DNS server, the first list comprising SGW candidates; and
determine the third list comprising SGW candidates is performed by:

based at least in part on the TAC where the mobile device is located, sending, to the DNS server, a second DNS query requesting SGW candidates; and
receiving, from the DNS server, the third list comprising SGW candidates.

13. The MME of claim 12, wherein:
determine the second list comprising PGW candidates is performed by:
sending, to the DNS server, a third DNS query comprising a first Access Point Name (APN) towards which the mobile device wants to create a first PDN for the first type of service; and
receiving, from the DNS server, the second list comprising PGW candidates supporting the first PDN; and
determine the fourth list comprising PGW candidates is performed by:
sending, to the DNS server, a fourth DNS query comprising a second APN towards which the mobile device wants to create a second PDN for the second type of service; and
receiving, from the DNS server, the fourth list comprising PGW candidates supporting the second PDN.

14. A wireless communication network comprising:
a base station;
a Domain Name System (DNS) server; and
a Mobile Management Entity (MME), wherein the MME comprises:
one or more processors;
a non-transitory storage medium; and
instructions stored in the non-transitory storage medium, the instructions being executable by the one or more processors to:
receive a first request for a first type of service for a mobile device within the wireless communication network;
determine a first list comprising Serving Gateway (SGW) candidates;
based at least in part on the first type of service requested, determine a second list comprising Packet Data Network (PDN) gateway (PGW) candidates, wherein each PGW candidate of the second list is co-located with a corresponding SGW candidate of the first list at a same node of the wireless communication network;
select a first SGW from the first list and a first PGW from the second list, the first SGW and the second PGW being co-located within a first node of the wireless communication network;
establish a first communication conduit between the first node and the base station corresponding to the first type of service for the mobile device;
receive a second request for a second type of service for the mobile device within the wireless communication network;
determine a third list comprising SGW candidates;
based at least in part on the second type of service requested, determine a fourth list comprising PGW candidates, wherein each PGW candidate of the fourth list is co-located with a corresponding SGW candidate of the third list at a same node of the wireless communication network;
select a second SGW from the third list and a second PGW from the fourth list co-located within a second node of the wireless communication network; and
establish a second communication conduit between the second node and the base station corresponding to the second type of service for the mobile device.

15. The wireless communication network of claim 14, wherein the first type of service relates to data service and the second type of service relates to voice service.

16. The wireless communication network of claim 15, wherein:
   determine the first list comprising SGW candidates is performed by:
   based at least in part on a Tracking Area Code (TAC) where the mobile device is located, sending, to the DNS server, a first DNS query requesting SGW candidates; and
   receiving, from the DNS server, the first list comprising SGW candidates; and
   determine the third list comprising SGW candidates is performed by:
   based at least in part on the TAC where the mobile device is located, sending, to the DNS server, a second DNS query requesting SGW candidates; and
   receiving, from the DNS server, the third list comprising SGW candidates.

17. The wireless communication network of claim 16, wherein:
   determine the second list comprising PGW candidates is performed by:
   sending, to the DNS server, a third DNS query comprising a first Access Point Name (APN) towards which the mobile device wants to create a first PDN for the first type of service; and
   receiving, from the DNS server, the second list comprising PGW candidates supporting the first PDN; and
   determine the fourth list comprising PGW candidates is performed by:
   sending, to the DNS server, a fourth DNS query comprising a second APN towards which the mobile device wants to create a second PDN for the second type of service; and
   receiving, from the DNS server, the fourth list comprising PGW candidates supporting the second PDN.

* * * * *